United States Patent [19]

Holst et al.

[11] E Re. 28,562

[45] Reissued Sept. 30, 1975

[54] BRAKE CONTROL FOR PREVENTING LOCKING DURING THE BRAKING OF A ROTATING WHEEL

[76] Inventors: Jan-Olov M. Holst, Laduvagen 12, 75247 Uppsala; Rolf E. Nordstrom, Johan Enbergsvag 48A, 17161 Solna; Christer U. Ekenberg, Apoteksvagen 6, 74100 Knivsta, all of Sweden

[22] Filed: Oct. 18, 1973

[21] Appl. No.: 407,501

Related U.S. Patent Documents

Reissue of:

[64] Patent No.: 3,614,176
Issued: Oct. 19, 1971
Appl. No.: 826,180
Filed: May 20, 1969

[52] U.S. Cl. ..... 303/61; 303/21 R
[51] Int. Cl.[2] ..... B60T 8/06
[58] Field of Search ..... 303/21, 24, 6, 61–63, 303/68, 69; 188/181 A

[56] References Cited

UNITED STATES PATENTS

| | | | |
|---|---|---|---|
| 3,032,995 | 5/1962 | Knowles | 303/21 FP UX |
| 3,124,220 | 3/1964 | Kell | 303/21 FP X |
| 3,231,315 | 1/1966 | Turnbull | 303/61 |
| 3,276,822 | 10/1966 | Lister et al. | 303/21 FP X |
| 3,361,487 | 1/1968 | Vriend | 303/61 |
| 3,495,879 | 2/1970 | Sharp | 188/181 A X |
| 3,514,162 | 5/1970 | Erlebach et al. | 303/21 FP |

*Primary Examiner*—Duane A. Reger
*Attorney, Agent, or Firm*—Parrott, Bell, Seltzer, Park & Gibson

[57] ABSTRACT

The combination, with a rotatable wheel and fluid-pressure-actuated brake for braking rotation of the wheel, of a mechanical control for preventing the wheel from locking during braking in which a frequency sensitive driven vibrating system having a predetermined resonant frequency is forced to vibrate at frequencies proportional to the rotational speed of the wheel and wherein displacement of one component of the vibrating system through a predetermined amplitude during forced vibration thereof at the predetermined resonant frequency actuates a fluid flow control for precluding increase in braking effect exerted on the wheel.

30 Claims, 18 Drawing Figures

BRAKE CONTROL FOR PREVENTING LOCKING DURING THE BRAKING OF A ROTATING WHEEL

Figure 1:
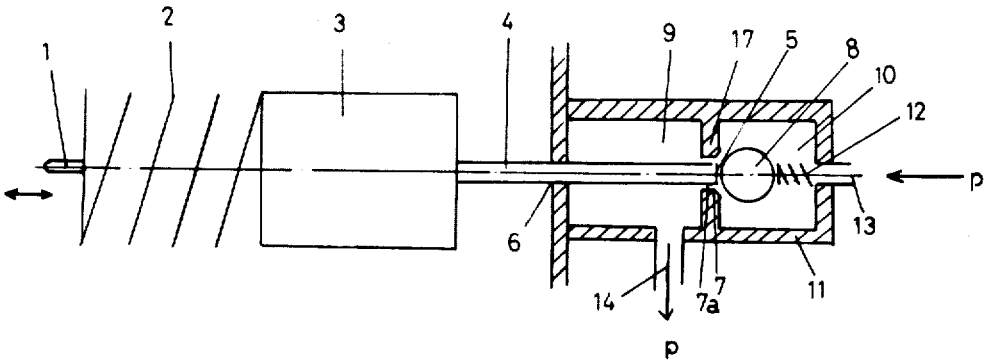

Matter enclosed in heavy brackets [ ] appears in the original patent but forms no part of this reissue specification; matter printed in italics indicates the additions made by reissue.

---

The invention refers to a brake control adapted to prevent locking when a rotating wheel is braked. The invention is particularly adapted to prevent locking during the braking of a vehicle wheel and the invention will hereafter be described in connection with the braking system of a vehicle. Yet, the invention is not restricted to this field of use and may also be applied in connection with many other fields of use in which a rotating wheel is braked with the aid of a brake circuit and where locking must not occur during [bracking] *braking*.

Brake systems as used at [ prewent ] *present* in vehicles exhibit the serious drawback that when the friction between the wheels of the vehicle and the rod surface is exceeded during braking locking will occur involving rapid braking of the vehicle wheel to standstill. Due to such locking the vehicle will start skidding and will get out of steering control. The most severe risk is caused by a locking of both the rear wheels of the [ vehcle ] *vehicle* whereas during locking of the front wheels of the vehicle the directional stability is maintained and skidding will not occur. When both of the rear [wbeels] *wheels* of the vehicle are locked skidding phenomena will immediately appear and the driver will experience great difficulties when trying to hold a steady course. Thus, there is an urgent need of simple devices preventing vehicle [whkels] *wheels* from locking and thereby eliminating the previously mentioned skidding [ gtendencies ] *tendencies*.

Various systems have previously been proposed for the purpose of avoiding locking during braking of vehicle wheels. One such system is based on the use of an additional measuring wheel adapted to sense the actual speed of the vehicle in relation to the ground, the value found during such measurement being compared in a comparison device with the speed measured for the various vehicle wheels. When a certain difference is detected between these two speed values a system will be brought into action to release the brake effect applied. This system is complicated and expensive in manufacture and, due to the delicacy of the electric components, it is unsuitable for use under the heavy stresses produced by the shocks and the like experienced during operation of the vehicle.

Also in brake systems of the pneumatic-type regulators have been previously known. One such system makes use of a rotating mass having the same speed as the [ weheel ] *wheel* to be braked. During a heavy braking of the wheel this rotating mass due to its [ intertia ] *inertia* will not be braked at once, a relative movement taking place between this mass and a sensing device connected to the drive shaft of the mass and acting against a cam device on the heavy mass. This relative movement will laterally shift the sensing device to actuate a valve member such as to vent the pneumatic brake circuit and to release the wheel from brake [actin] *action*. This arrangement is only adaptable to pneumatic systems because in a hydraulic system hydraulic oil would escape whenever the control is actuated. Moreover the arrangement is expensive to manufacture and is not either fully reliable and for these reasons the system has not been widely accepted.

According to the present invention there is provided a brake control eliminating the problems which, as mentioned above, have been encountered in previously known brake controls. The invention provides a brake control having few movable parts, small dimensions and a high degree of reliability. The device is easily manufactured and may be produced at low cost.

The main object of the invention is a brake control preventing a wheel from locking during braking, provided with a member connected to the brake system of the wheel and adapted to be controlled by a sensing device for temporary removal of the applied brake action. The invention is particularly characterized in that the [ wensing ] *sensing* device is adapted to be, preferably mechanically, actuated for reciprocating movement by driving pulses proportional to the rotary speed of the wheel, the sensing device being connected to a resilient element having a heavy mass to form a swinging system which at its natural resonant swinging frequency will react to said driving pulses by performing an increased swinging amplitude at which the system actuates a valve member to release the brake effect applied.

The device according to the present invention comprises a unit which may be incorporated into existing vehicles as well as vehicles under construction. In the normal brake circuit of the vehicle a valve unit is incorporated which, on the one hand, is able to close [ he ] *the* conduit through which brake fluid is supplied to the wheel brake cylinder and, on the other hand, may act as a pumping unit to release the braking pressure previously applied to the wheel brake cylinder. As a means for controlling the valve and pump unit there is provided a sensing means adapted to receive reciprocating motion impulses from the rotating wheel. Such impulses received by the sensing device are applied to a swinging mass which under the action of impulses [ correwponding ] *corresponding* to the natural resonant swinging frequency of the system [ wil ] *will* exhibit an increase in amplitude, this increase being used to control the valve and pump unit such as to interrupt the supply of pressure fluid and to release previously applied braking pressure from the wheel brake [ cyinder ] *cylinder* by a pumping action of the valve [ andpump ] *and pump* unit. Hereby the braking action is temporarily released from the wheel and as the locking is thus counteracted and the wheel will not assume a zero velocity the ability of the [ wbeel ] *wheel* to absorb side forces will remain substantially unimpaired and the skidding risk is [ subwtantially ] *substantially* reduced.

In the continuing development it has been discovered to be an important factor to increase the frequency of the device controlling the operation of the valve and in accordance therewith it is an object of the present [ tinvention ] *invention* to provide an arrangement adapted to increase the frequency of the cycle of operation of the valve in relation to the frequency received from the [ impuls ] *impulse* generator.

Further objects and features of the present invention will appear from the enclosed claims.

Figure 2:
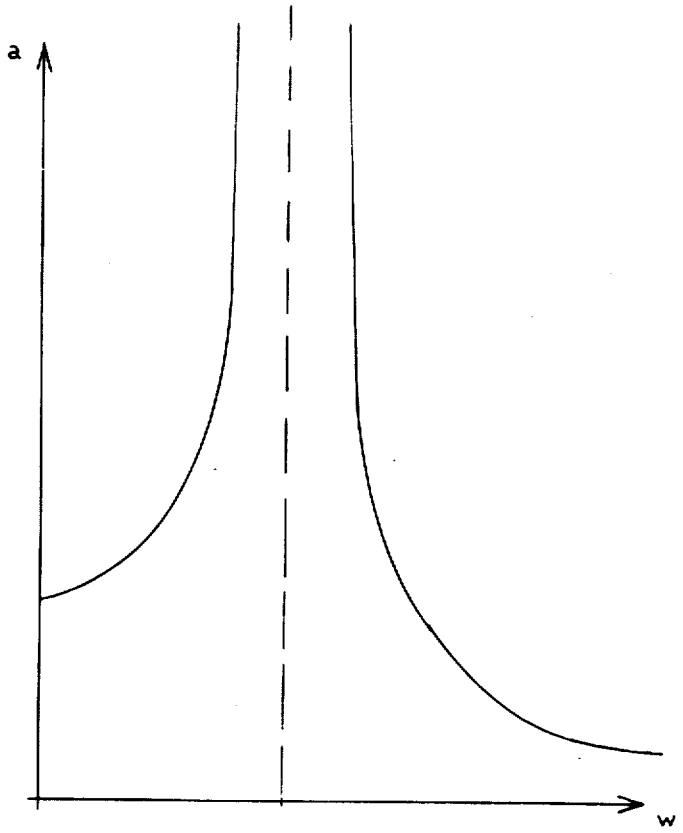
Figure 3:
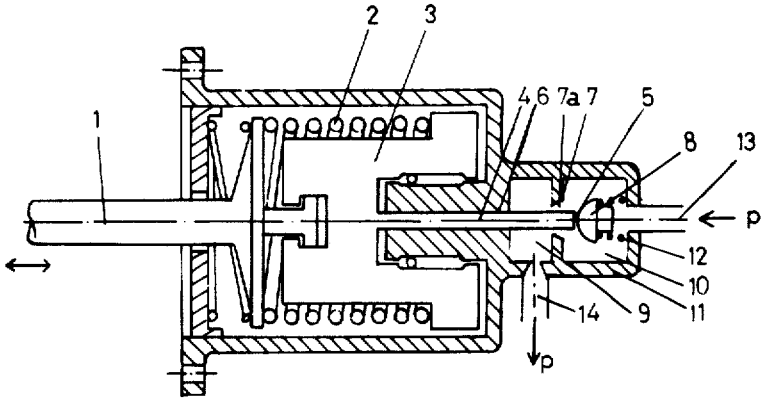
Figure 4:
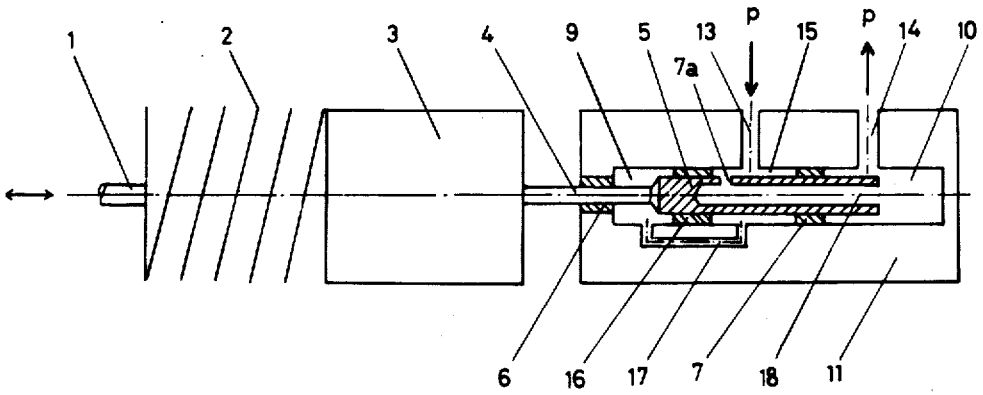
Figure 5:
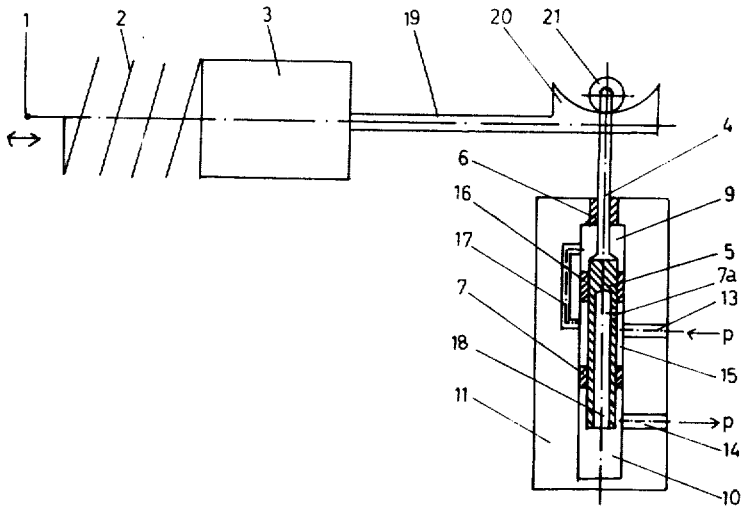
Figure 6:
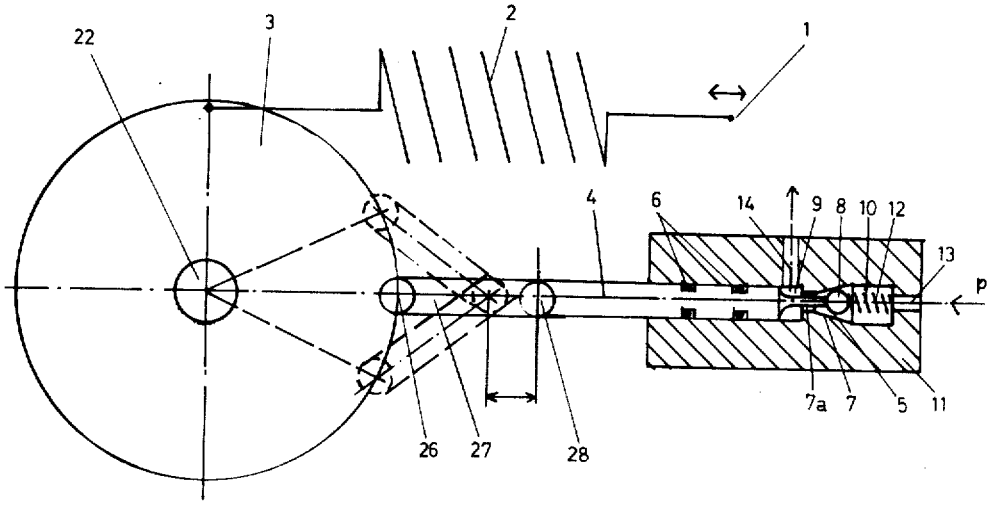
Figure 7:
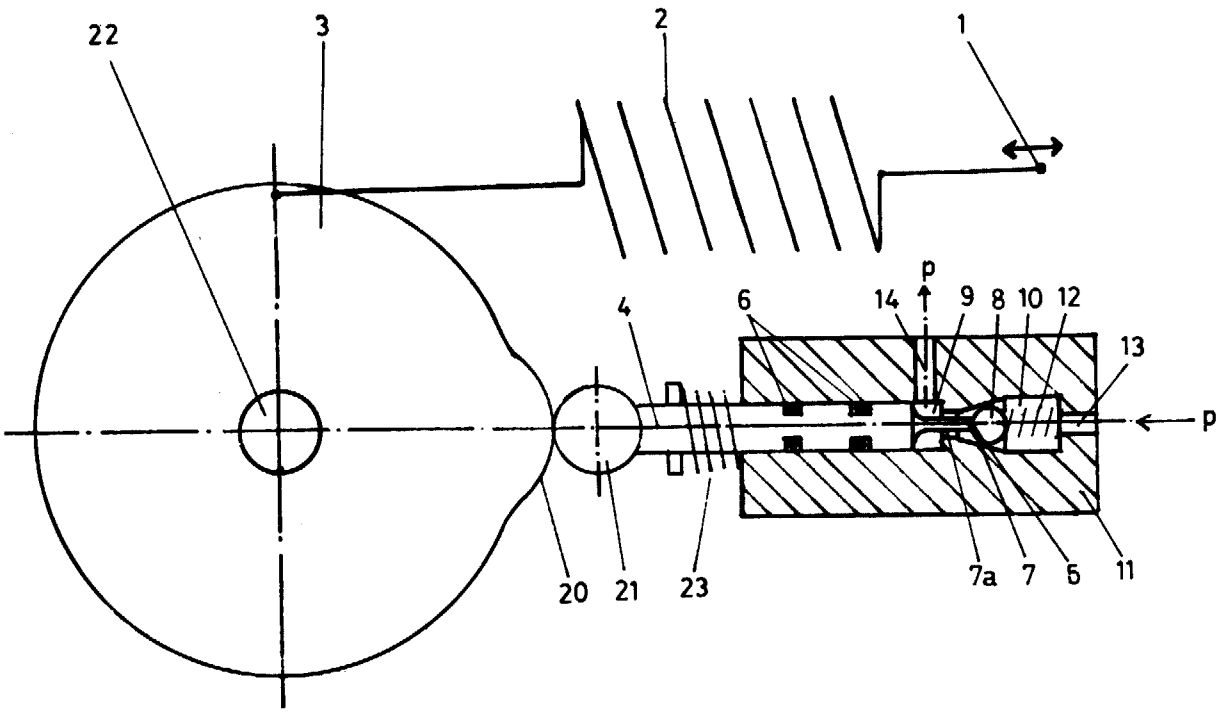
Figure 8A:
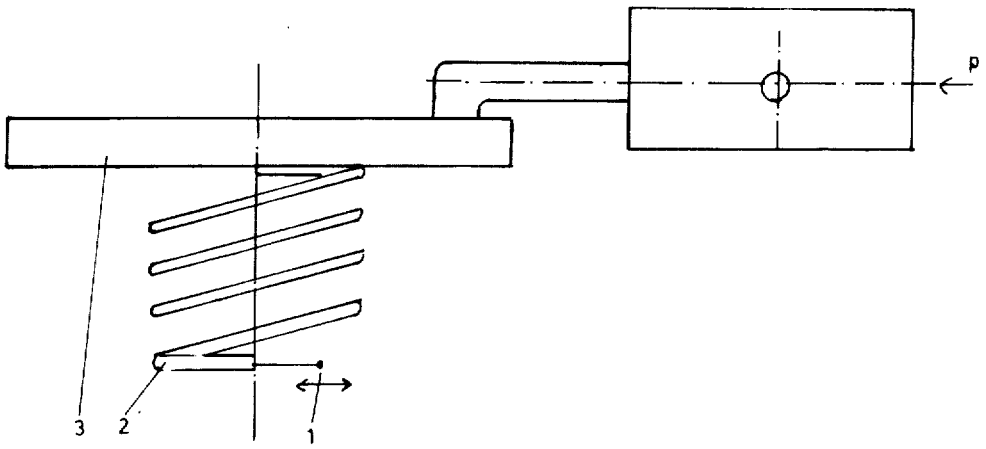
Figure 8B:
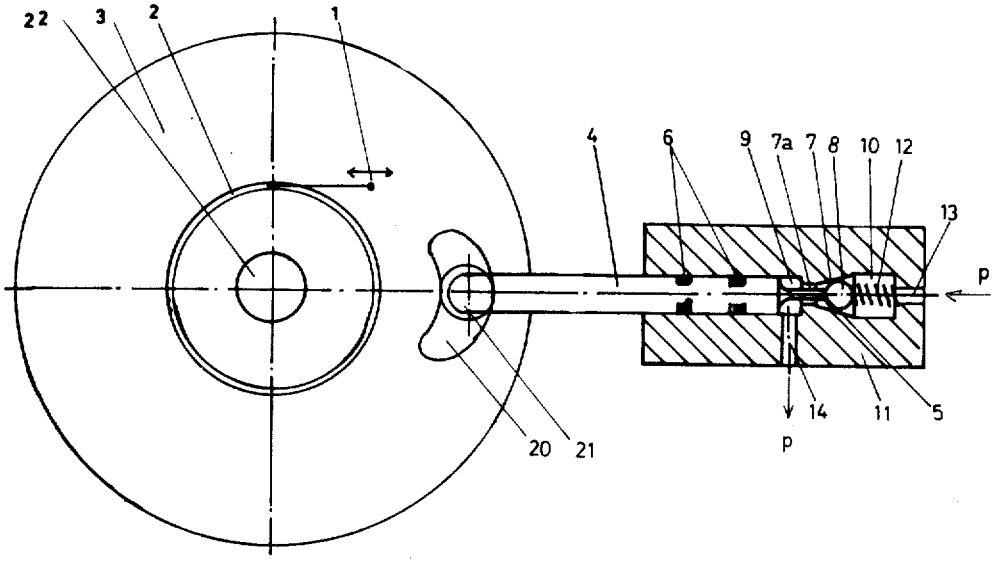
Figure 9:
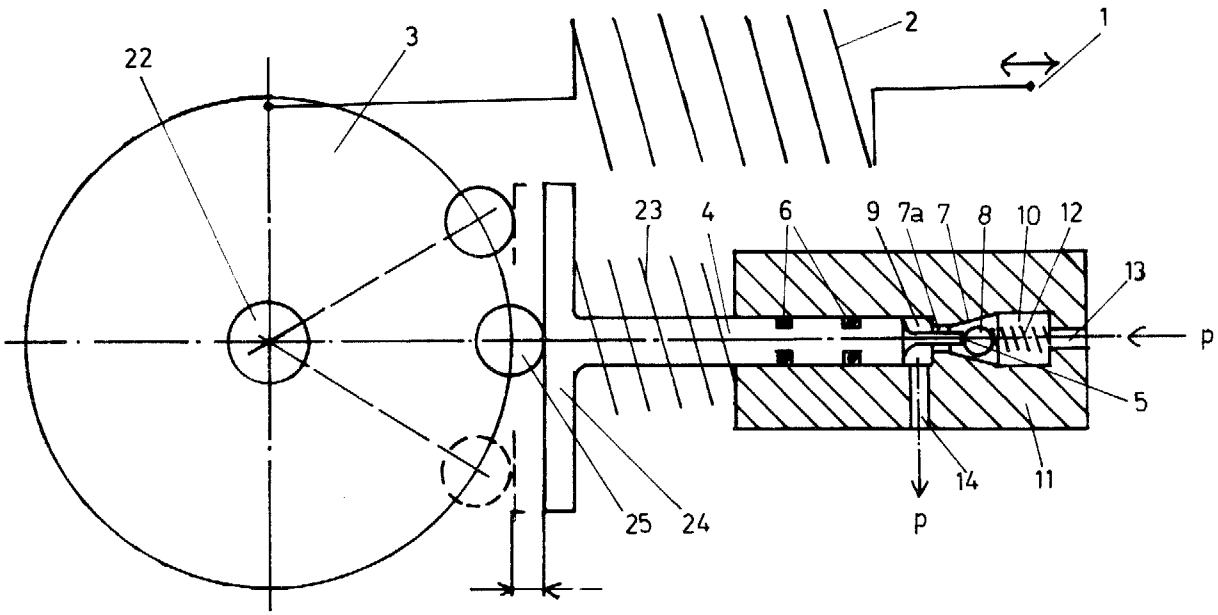
Figure 10A:
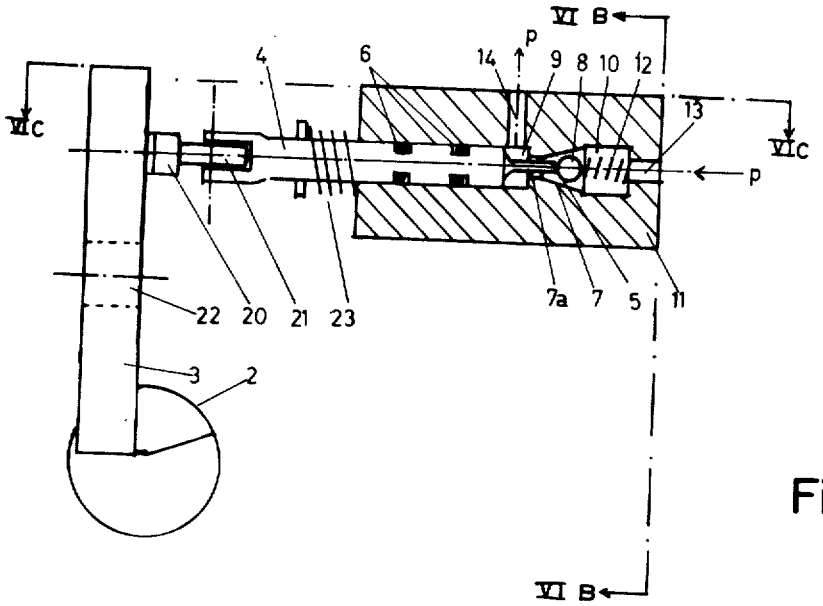
Figure 10B:
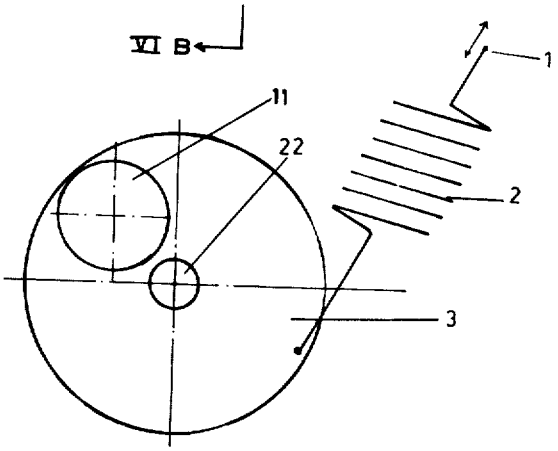
Figure 10C:
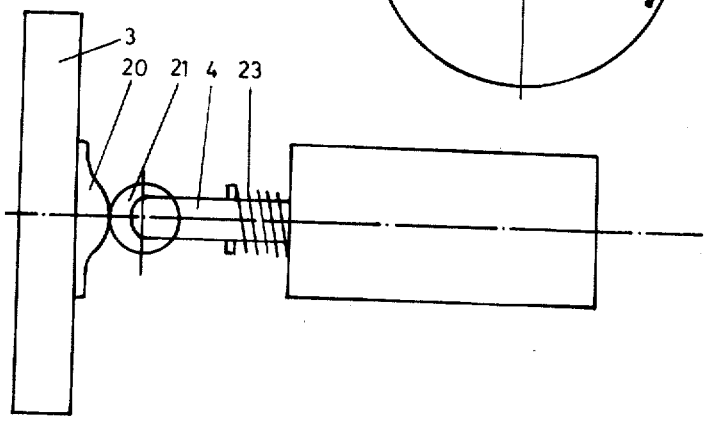
Figure 11:
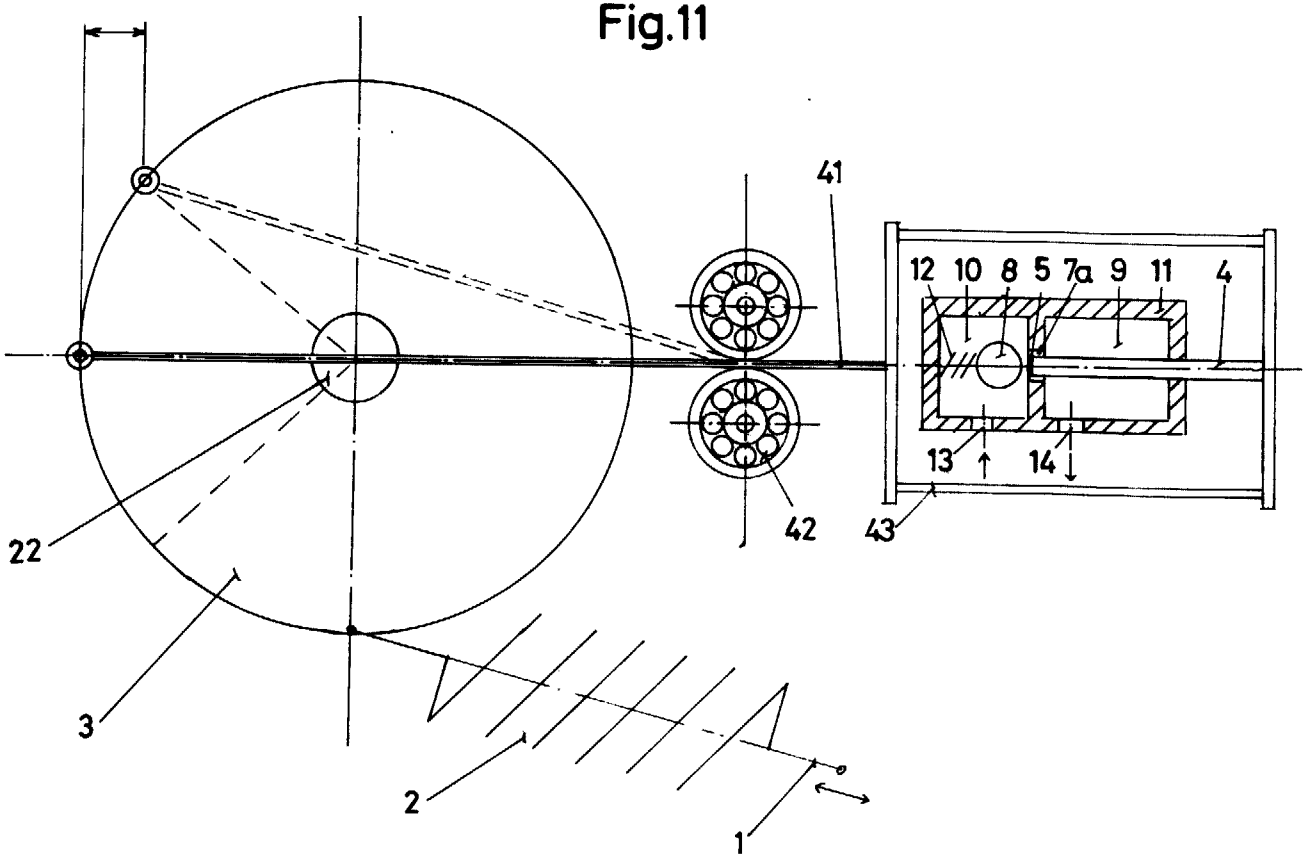

The invention will be described in greater detail by reference to the drawing and in respect to embodiments adapted to be connected to the brake circuit system of a motor vehicle. In the drawing, FIG. 1 is a schematic representation of the device according to the present invention, FIG. 2 is a graphic representation showing the [ swigning ] *swinging* amplitude of the system during braking of a wheel, FIG. 3 is a sectional elevation of an embodiment of the brake control according to the invention, FIG. 4 is a sectional elevation of another embodiment of the brake control, FIG. 5 is a schematic view, partly in section, of the brake control according to the present invention, FIG. 6 is a schematic representation, partly in section, of the brake control provided with a modified swinging mass and a transfer device acting between the swinging mass and the valve unit, also the valve unit being modified in relation to that shown in FIG. 5, FIG. 7 is a schematic view, partly in section, similar to FIG. 6 but showing a modified transfer device, FIG. 8A is a plan view and FIG. 8B is an elevation, partly in section, in a plan turned 90° in relation to FIG. 8A of an embodiment which on the one hand comprises positive guiding means acting between the swinging mass and the transfer member controlling the valve unit and on the other hand, a torsion spring replacing the coil spring shown in the previous Figures, FIG. 9 is a sectional view of another modified embodiment of the transfer device acting between the swinging mass and the transfer member controlling the valve, FIG. 10A is a plan view, in part in section, of an embodiment, in which the valve unit is disposed at right angles to the plane in which the swinging mass is oscillating, FIG. 10B is an elevation of the same embodiment seen along line VIB—VIB from the right in FIG. 10A, FIG. 10C is an elevation of the same embodiment as shown in FIGS. 10A and 10B, viewed along line VIC—VIC downwardly in FIG. 10A, FIG. 11 is a schematic elevation, partly in section, of an embodiment of the invention in which the transfer member is a stiff resilient strip element and in which the valve unit is controlled from the opposite side in relation to the swinging mass as compared with the preceding Figures.

Figure 12A:
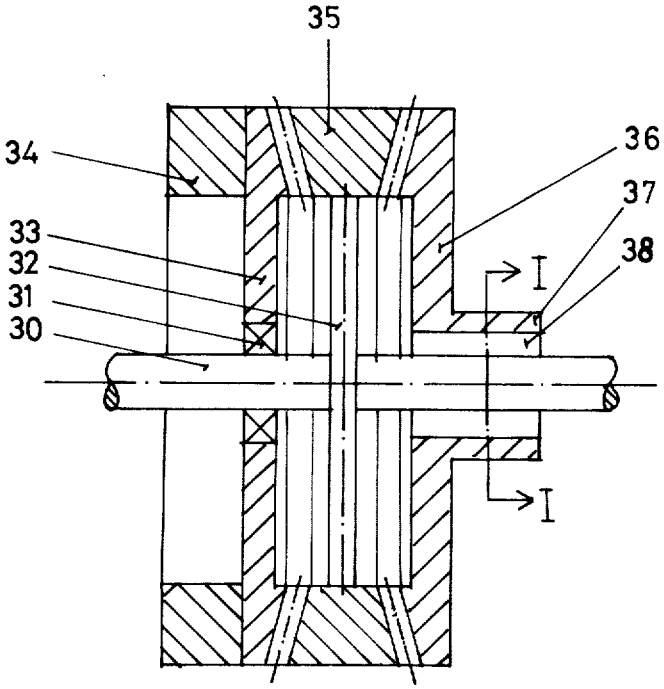
Figure 12B:
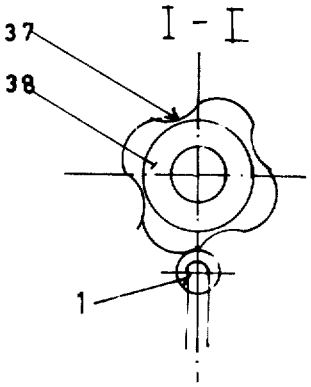
Figure 13:
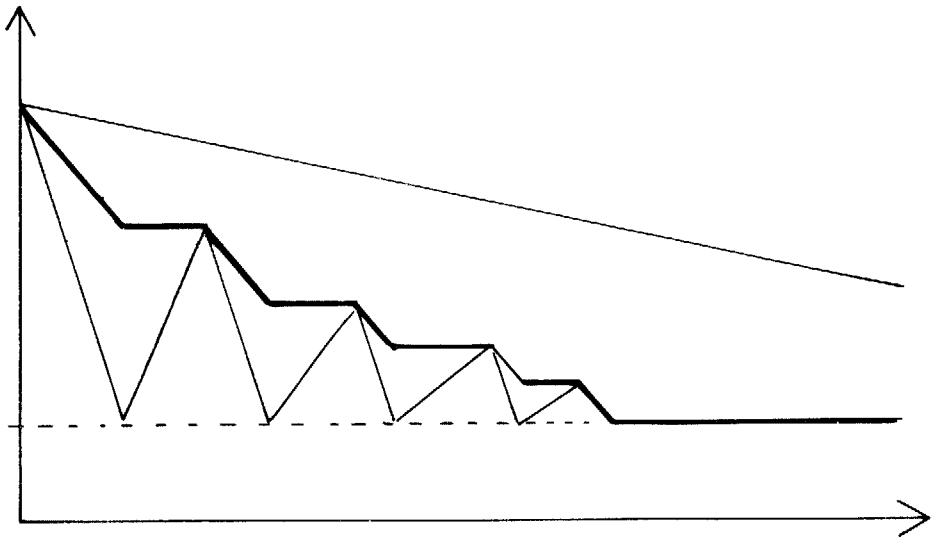
Figure 14:
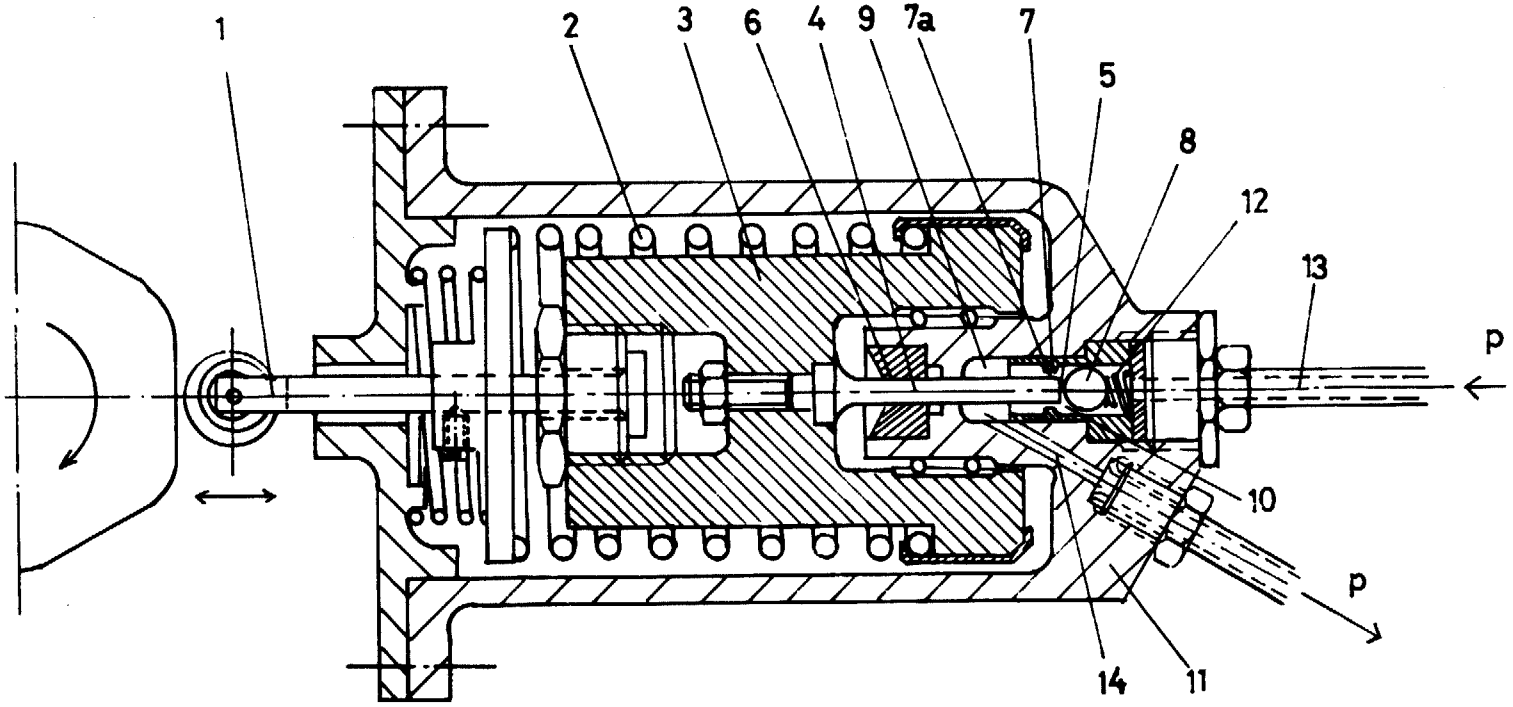

FIG. 12A is a sectional view of a device adapted to be inserted between the incoming rotatable shaft and the impulse [ gnerator ] *generator* for the purpose of reducing the generating [ freqeuency ] *frequency* to enable the system more quickly to go down to the [ cricital ] *critical* natural resonant swinging frequency, FIG. 12B is a section along line I—I in FIG. 12A, FIG. 13 is a graphic representation illustrating the number of revolutions obtained by the use of the device according to FIG. 12 in relation to the time and FIG. 14 is a sectional view of a practical embodiment of a particularly compact construction enabling the unit to be attached adjacent the rear wheels of a vehicle.

The device which may be incorporated into the brake system of both new and old motor cars comprises a sensing device 1 contacting a member such as a cam for receiving driving pulses corresponding to the angular velocity of the wheel, said sensing device at its rear end being connected with a [ resileint ] *resilient* element 2, such as a helical spring, said element being made of material having low intrinsic attenuation. Spring 2 is connected to or integral with a heavy mass 3 which at its end opposite to the sensing device merges into a reduced elongate part 4. Through a sealing gasket 6 part 4 extends into a housing 11, hereinafter designated as valve housing. Against the outer end 5 of part 4 abuts a ball 8 which by means of a spring 12 is pressed against a valve seat 7 provided around an aperture 7a in a wall 17. Ball 8 and spring 12 are disposed within a chamber 10 of valve housing 11 which chamber 10 by means of wall 17 is separated from another chamber 9 of the valve housing 11. Normally ball 8 will not be fully seated on seat 7 because part 4 extending from the heavy mass 3 with its end 5 slightly forces back ball 8. During braking, brake fluid will enter through an inlet 13 into chamber 10 and will pass through aperture 7a into chamber 9 and further to the brake [ cyinder ] *cylinder* [ thrugh ] *through* an outlet 14. During normal braking from high velocities the brake control according to the present invention will not [ inerfere ] *interfere* with the action of the normal brake system of the vehicle. However, the brake control will come into action at a speed corresponding to a [ cricitcal ] *critical* frequency of the swinging system comprising the sensing device 1, spring 2 and mass 3.

The operation of the device is as follows. Brake fluid under pressure is supplied from the main brake cylinder through the inlet 13 into chamber 10 and further [ thorugh ] *through* aperture 7a into chamber 9 to be transferred through outlet 14 to the wheel brake cylinder of the vehicle. In this initial phase of operation ball 8 with the aid of the forcibly introduced brake fluid will urge rod 4 and the heavy mass 3 to the left in FIG. 1, this movement being transferred by the spring to the sensing device 1 which is urged into abutment against said cam member or the like. This cam member will impart to the sensing device 1 a longitudinally reciprocating movement as indicated by the arrow to the left in FIG. 1, said movement being transferred to the swinging system 1, 2, 3, 4 with a slight attenuation due to spring 2. During continued braking the frequency of this movement will diminish and at a predetermined frequency which suitable corresponds to a peripheral velocity within the range of 10 to 20 kilometer/hour of the wheel this frequency will be within the [ cricital ] *critical* resonant swinging range of the swinging system causing the swinging amplitude to grow substantially as shown in the diagram of FIG. 2. Hereby the movement imparted to the sensing device 1 is increased and part 4 extending from the mass is moved sufficiently far to the left in FIG. 1 to [ enabe ] *enable* valve ball 8 to become seated on seat 7. Portion 5 of elongate part 4 will then get out of contact with ball 8 which thus will be urged into contact with seat 7 by fluid pressure action from the inlet 13 and by spring 12. Thus, no further increase of the brake force will come into action in chamber 9 of valve housing 11 where outlet 14 is provided. During continued movement to the left of spring 2 with its heavy mass 3 and its elongate extension 4 a pumping effect will be exerted because the volume of chamber 9 will be increased by part 4 moving to the left while ball 8 completely closes chamber 9. Hereby braking fluid will be pumped back from the outlet 14 whereby the brake effect is released from the wheel. Due to release of the brake effect the wheel will again pick up speed and the cam member transferring the movement to the sensing device 1 will operate at increased speed increasing the oscillating frequency to a value above the resonant swinging frequency of the swinging system, the increase in amplitude thereby being removed and the swinging movement being so reduced that end portion 5 of part 4 will urge ball 8 away from its contact with seat 7. Hereby braking pressure may again be transferred from the inlet 13 to chamber 9 and further to outlet 14 whereby the wheel is again exposed for braking action. By this action which is repeated several times every second locking of the braked wheel will be prevented because the brake action will be released at a rotational speed of the wheel corresponding to the resonant oscillating frequency of the swinging system 1, 2, 3, 4, 5.

In FIG. 2 there is schematically shown the oscillating amplitude at varying speeds. The values at which the increase in amplitude will take place may be chosen arbitrarily, the spring and heavy mass being chosen on the basis of the formula $\omega = \sqrt{k/m}$ where $\omega$ = the angular velocity of the wheel, k = the spring constant and m = the mass. In FIG. 2 the critical resonant oscillating frequency has been chosen at a value corresponding to a peripheral velocity of the wheel of 17 kilometer/hour.

FIG. 3 shows a typical construction of a practical embodiment of the invention. This construction is particularly compact to enable the device to be used whenever small dimensions are important requirement, e.g. at the rear [ wbeels ] *wheels* of a motor vehicle. The sensing device 1 is caused to perform a [ reciporacting ] *reciprocating* movement in the direction of the arrow at the left end of FIG. 3, this recriprocating movement being transferred to spring 2 with the heavy mass 3, the elongate part 4 with its end portion 5 contacting ball 8. While the outlet opening 14 from chamber 9 is shown provided with a restriction, any suitable construction may be used for obtaining correct flow conditions.

FIG. 4 shows a modified embodiment of the invention. The left portion of the device comprising the sensing device 1, spring 2, the heavy mass 3 and the elongate part 4 has the construction [ dewcribed ] *described* previously whereas the right-hand part [ compriwing ] *comprising* the valve element proper is modified in comparison with FIG. 1. For ball 8 an elongate sliding valve body 5 such as a spool integral with part 4 has been substituted, said valve spool body having an axial bore 18. The valve body is longitudinally movable within housing 11 which is subdivided into three chambers 10, 15, 9 by partition gaskets 7, 16. The valve spool body extends into chamber 9 through a gasket 6. Bore 18 is in communication with chamber 15 via a port 18a. Fluid pressure is introduced through inlet 13 and is passed via chamber 15 and port 18a into and through bore 18 to chamber 10 to be discharged through outlet 14 to the brake cylinder. When the swinging system 1, 2, 3, 4, 5 is shifted to the left the [ supqly ] *supply* of brake fluid to the outlet 14 through spool 5 is interrupted. When mass 3, part 4 and spool 5 are shifted to the left the volume of chamber 10 will increase, brake fluid thereby being pumped from the brake cylinder of the wheel due to the fact that a pressure decrease takes place within outlet 14. A passage 17 connects chambers 9 and 15 for the purpose of equalizing the pressure within these two chambers. Functionally, the modification [ sbown ] *shown* in FIG. 4 is fully equivalent to the basic embodiment [ shwon ] *shown* in FIG. 1 in spite of the fact that ball 8 and spring 12 have been eliminated and replaced by the valve spool formed by end portion 5 of part 4, this valve spool performing the same function as ball 8 and spring 12. Hereby the number of movable parts has been reduced and a still more compact embodiment of the device has been obtained.

The transfer device acting between the system comprising the spring element 2 and the heavy mass 3, on the one hand, and the control valve unit, on the other hand, comprises in the embodiment according to FIG. 5 a rod 19 which at its end remote from the mass 3 is provided with a cam member 20. A cam follower 21 is in contact with the cam curve of the cam member. When the transfer device 19 is shifted from its equilibrium position the cam follower 21 will be lifted upwardly from the position shown in FIG. 5. Due to this movement the cam follower will displace the rod 4 connected to the slide valve body 5.

In the embodiment shown in FIG. 6 spring 2 is connected to a heavy swinging mass 3 journalled for oscillating movement about a center 22. In this embodiment the valve unit is a ball valve comprising a ball 8 adapted to seal against a seat 7. Chambers 10 and 9 of the valve are in mutual communication via a passage 7a through which a reduced portion of control rod 4 extends. At the end of a rod 4 remote from the valve a link 27 is attached for swinging movement about pivot 28, the free end of the link being attached at pivotal point 26 to the swinging mass 3. At the critical natural resonant frequency of the system an increase of amplitude will occur which causes the swinging mass to oscillate about the center 22. Hereby rod 4 will be imparted a reciprocating movement which will control the closing of valve 11 by permitting ball 8 which previously had been pushed off the seat by the reduced end of rod 4 to come into sealing contact with seat 7 and thereby to close the application of braking pressure. Thereafter the volume of chamber 9 will be increased by rod 4 being shifted to the left in FIG. 6, whereby the pressure applied to the wheel brake cylinder will be released in a similar way as previously described.

In the embodiment according to FIG. 7 the transfer device has been modified in such a way that the swinging mass 3 which also here is adapted to oscillate about a central pivot 22 is provided with a cam surface 20 against which a cam follower 21 abuts. The cam follower, which is shown in the form of a spherical body, e.g. a ball bearing or the like, is connected with rod 4 which in turn in a way previously described extends into an actuates valve unit 11. A spring 23 is inserted between the valve and an abutment such as to urge the cam follower against the cam surface and to maintain constant contact between the cam follower and the cam surface.

FIGS. 8A and 8B show a modified arrangement in which, on the one hand, the previously shown and described coil spring 2 has been replaced by a torsion spring and, on the other hand, rod 4 is positively guided in a groove in the swinging mass 3, said groove forming the equivalent of cam surface 20 of the previous embodiments. This modified embodiment will operate exactly as the previously described embodiment.

In FIG. 9 there is shown an embodiment in which only the transfer device is modified in relation to previously described embodiments. At its end remote from the valve rod 4 is provided with an abutment plate 24 abutting against a spherical body 25 attached to the swinging mass. During oscillating movement of the swinging mass 3 the spherical body 25 will move along an arc of a circle having the radius of the swinging mass 3 causing the abutment plate 24 to move over the distance indicated in the FIG. as the swinging mass is oscillating between the positions indicated in broken lines. A spring 23 is adapted to press abutment plate 24 into constant contact with the spherical body 25.

FIGS. 10A, B and C are different views of one embodiment of the invention which comprises the same basic elements as the embodiment according to FIG. 8, however, with cam surface 20 arranged on the side surface of the swinging mass 3 rather than on its peripheral edge as in FIG. 8. Hereby a more compact construction is obtained due to the fact that the valve unit will be disposed at right angles to the plane of [oscilation] *oscillation* of the swinging mass.

In FIG. 11 there is shown an embodiment in which the transfer device takes the form of a stiff resilient blade 41 which is attached to the periphery of the swinging mass 3. The resilient blade 41 passes through a guide means 42 to a link system 43 connecting the resilient blade 41 with rod 4 controlling the operation of valve 11. In the embodiment shown in FIG. 11 the advantage is obtained that if for some reason blade 41 will crack, the braking fluid supply to the valve will close ball valve 8 so that no braking action can be applied to the wheel served by the system shown. In order to avoid any risk due to the fact that the driver of the vehicle who relies upon the action of the brake control system according to the present invention will be panic stricken by unexpected locking of the rear wheels during braking, the embodiment according to FIG. 11 causes the braking action to cease also in connection with mechanical faults and the locking risk — unexpected and therefor still more dangerous — is thus ruled out also in cases where such a fault occurs.

In spite of the fact that the practical tests made so far have shown that a great amount of "slip," i.e. the ratio between the speed of the vehicle and the rotational velocity of the wheel in a certain moment, does not appear to impair the directional stability of the vehicle, continued research and development may show that decreased "slip" improves directional stability. For this purpose, according to the present invention, there is provided a device causing the impulse generator frequency to be changed down thereby more quickly to bring about the desirable release of the braking action on the wheel. Hereby the wheel velocity will be successively reduced and "slip" of the wheel will become substantially constant rather than having a very great value in an initial phase with this value successively decreasing in dependance on the decrease of vehicle speed, the device according to the present invention without a change down device of the type here in question normally yielding a substantially constant predetermined rotational velocity of the wheel.

A device suited for this specific purpose of reducing the frequency of the impulse generator is shown in FIGS. 12A and B, this device comprising an input shaft 30 which is imparted a turning movement proportional to the angular velocity of the wheel. A second shaft 32 is rigidly attached at right angles to shaft 30, planet wheels 35 being freely rotatable on the free ends of this second shaft 32. These planet wheels are adapted to couple, on the one hand, a flywheel unit comprising a cogwheel 33 journalled on shaft 30 by means of a bearing 31 and having a heavy mass 34 and, on the other hand, a second cogwheel 36 adapted to rotate in relation to shaft 30 by means of a clutch 38.

Cogwheel 33 is provided with a cam surface 37 against which the sensing device 1 is adapted to abut. Said clutch 38, which for example may be a friction clutch, must be adapted to transmit the power required to enable cogwheel 36 and its cam surface 37 to drive cam follower 1. However, clutch 38 must also permit a relative movement between cogwheel 36 with its cam element 37 and shaft 30 in order that the function described hereafter shall be obtained. During normal operation and light braking the unit shown is driven at the same speed as the input shaft 30. However, upon a powerful retardation the flywheel unit 33, 34 will continue to rotate with a speed in excess of that of shafts 30 and 32 due to the fact that the unit is rotatably supported by shaft 30. Shaft 32 attached to shaft 30, however, will continue to rotate at the same rotational speed as shaft 30 so that planet wheels 35 will transfer a reverse relative movement to cogwheel 36, which thus will rotate at a lower speed as compared with input shaft 30. Hereby cam surface 37 will more quickly reach the speed corresponding to the critical natural resonant frequency of the system in accordance with the curve shown in FIG. 13. In the diagram of FIG. 13 the number of revolutions is shown as a function of time, the upper curve showing the speed of the vehicle, whereas the speed of the impulse generator is shown by the lower curve which is shown to extend in a zigzag fashion down to the critical number of revolutions where the brake effect is released in accordance with the previous description, up again to the same velocity as the wheel and thereafter the generator speed will again decrease down to the critical frequency of the system and so on. Thus, the wheel will be imparted a speed decreasing in a stepwise fashion as indicated by the heavy central curve showing that the wheel will be imparted a lower speed than the vehicle but not a speed below the angular velocity value corresponding to the critical natural resonant frequency of the system.

In FIG. 14 there is shown an embodiment of the invention which is extremely compact and adapted to be disposed immediately adjacent the rear wheel of a vehicle. As to its function the construction shown in this Figure is in agreement with the previously described embodiment, however, the design is particularly compact and protected to withstand the stresses inherent in the specific position of use.

The embodiments described in connection with FIGS. 5–14 have the additional advantages that a well defined equilibrium position is obtained for the swinging system, [ that the braking pressure applied cannot act on the swinging system but will be absorbed in bearings or the like ] and that many constructive problems are solved such as problems in connection with the journalling of the movable parts used.

The invention has been shown and described in connection with brake systems for a motor vehicle. However, the invention may be used also in connection with any hydraulic or pneumatic servo-system and on any field where a rotating wheel is to be braked and where locking of the wheel during braking is undesirable. Examples of such fields of use are feeding devices for material in the form of tapes, webs or wire where in many cases a braking effect is desirable while at the same time a locking of the rotating wheels will be detrimental. Thus, the embodiments shown and described do not involve a limitation of the present invention the scope of which is exclusively defined in the attached claims.

What we claim is:

1. In a rotatable wheel and fluid-pressure actuated brake means for braking rotation of the wheel, the combination therewith of mechanical control means for preventing the wheel from locking during braking and comprising:

motion-transmitting means operatively coupled to said wheel and responsive to rotation thereof for moving in pulsation at frequencies proportional to the rotational speed of said wheel and including a frequency sensitive driven vibrating means having a predetermined resonant frequency and being responsive to rotation of said wheel at a predetermined speed for displacement of one component of said vibrating means through a predetermined amplitude during forced vibration of said vibrating means at said predetermined resonant frequency, and braking effect varying means operatively connected to said vibrating means and to said brake means and including fluid flow control means responsive to displacement of said one component through said predetermined amplitude for precluding increase in braking effect exerted on said wheel while said wheel is rotating at the speed which causes forced vibration of said vibrating means at said predetermined resonant frequency and thereby avoiding locking of the wheel during braking.

2. The combination according to claim 1 wherein said motion transmitting means comprises a cam member and a cam follower cooperating for moving said cam follower with pulsations proportional to the rotational speed of the wheel.

3. The combination according to claim 2 wherein said cam member and cam follower cooperate for moving said cam follower with sinusoidal movement.

4. The combination according to claim 1 wherein said vibrating means and said fluid flow control means cooperate during pulsating movement of said motion transmitting-means at frequencies above and below said resonant frequency by unvaryingly passing the pressure of fluid actuating said brake means.

5. The combination according to claim 1 wherein said vibrating means comprises an oscillating system of a mass and a spring coupled to said mass for transmitting pulsating movement thereto, said mass and said spring responding to driving pulsations of varying frequencies by varying the amplitude of displacement of said mass.

6. The combination according to claim 5 wherein said mass of said vibrating means is operatively connected to said fluid flow control means of said brake effect varying means for periodically interrupting pressure fluid supply to said brake means and for releasing said wheel from applied brake action in response to movement of said mass through a predetermined amplitude of displacement.

7. The combination according to claim 6 wherein said mass and said fluid flow control means when actuated cooperate for releasing applied brake action during a period of time longer than the period of time during which applied brake action is maintained.

8. The combination according to claim 5 further comprising means mounting said oscillating system of a mass and a spring for linear oscillating movement of said mass.

9. The combination according to claim 5 further comprising means mounting said oscillating system of a mass and a spring for rotary oscillating movement of said mass.

10. The combination according to claim 5 wherein said mass and spring are related one to another and to the angular velocity of the wheel in accordance with the formula $\omega = \sqrt{k/m}$ where $\omega$ denotes the angular velocity of the wheel at the resonant frequency, k denotes the spring constant and m denotes the mass.

11. The combination according to claim 1 wherein said fluid flow control means comprises a housing defining inlet chamber means for flow of brake actuating fluid thereinto and outlet chamber means for flow of brake-actuating fluid therefrom, valve means for controlling flow of fluid from said inlet chamber means to said outlet chamber means, and means for varying the volume of said outlet chamber means for thereby reducing the pressure of fluid actuating said brake means and further wherein said volume-varying means and said valve means cooperate in responding to movement of said vibrating means for alternately increasing and decreasing the braking effect applied to said wheel.

12. The combination according to claim 11 wherein said valve means comprises a valve spool.

13. The combination according to claim 11 wherein said valve means comprises a ball valve.

14. The combination according to claim 13 wherein said ball valve comprises a valve seat interposed between said inlet and said outlet chamber means, a ball member and means biasing said ball member toward a seated position on said valve seat.

15. The combination according to claim 1 wherein said motion-transmitting means comprises means for increasing the frequency of pulsating movement relative to the rotational speed of the wheel.

16. The combination according to claim 15 wherein said frequency-increasing means comprises a cam surface and a cooperating cam follower.

17. The combination according to claim 15 wherein said frequency-increasing means comprises a link system.

18. The combination according to claim 1 wherein said motion transmitting means comprises means for decreasing the frequency of pulsating movement relative to the rotational speed of the wheel.

19. The combination according to claim 18 wherein said frequency-decreasing means comprises planetary transmission means operatively interposed between said wheel and said vibrating means, said planetary transmission means including a driven shaft coupled to said wheel for rotation therewith, output gear means coupled to said vibrating means for transmittal of pulsating movement thereto, overrunning clutch means for coupling said driven shaft and said output gear means together upon the rotational speed of said driven shaft exceeding that of said output gear means, planet gear means carried by said driven shaft for rotation therewith and meshing with said output gear means, and inertial gear means meshing with said planet gear means and coupled thereby to said output gear means, and inertial gear means being driven from said driven shaft through said planetary gear means upon said clutch means effecting coupling of said output gear means and said driven shaft and said inertial gear means driving said output gear means through said planetary gear means upon said clutch means effecting uncoupling of said output gear means and said driven shaft.

*20. In a rotatable wheel and fluid-pressure actuated brake means for braking rotation of the wheel, the combination therewith of control means for preventing the wheel from locking during braking and comprising:*

*a mass supported for linear oscillating movement in alternate directions from an equilibrium position,*

*spring means operatively connected with said mass for defining therewith a swinging system and for imposing on said mass force biasing said mass toward said equilibrium position,*

*said swinging system responding to vibration at a resonant frequency by displacing said mass through more than a predetermined amplitude in alternate directions from the equilibrium position and responding to vibration at any frequency other than said resonant frequency by failing to displace said mass through said predetermined amplitude, and*

*valve means operable between flow permitting and flow blocking positions and operatively connected with said mass for being maintained in flow permitting position while said mass is in said equilibrium position and with said brake means for responding to displacement of said mass through at least said predetermined amplitude by moving from flow permitting position to flow blocking position and thereby interrupting braking effect exerted on said wheel.*

*21. In a rotatable wheel and fluid-pressure actuated brake means for braking rotation of the wheel, the combination therewith of control means for preventing the wheel from locking during braking and comprising:*

*a mass supported for rotary oscillating movement in alternate directions from an equilibrium position,*

*spring means operatively connected with said mass for defining therewith a swinging system and for imposing on said mass force biasing said mass toward said equilibrium position,*

*said swinging system responding to vibration at a resonant frequency by displacing said mass through more than a predetermined amplitude in alternate directions from the equilibrium position and responding to vibration at any frequency other than said resonant frequency by failing to displace said mass through said predetermined amplitude, and*

*valve means operable between flow permitting and flow blocking positions and operatively connected with said mass for being maintained in flow permitting position while said mass is in said equilibrium position and with said brake means for responding to displacement of said mass through at least said predetermined amplitude by moving from flow permitting position to flow blocking position and thereby interrupting braking effect exerted on said wheel.*

*22. In a rotatable wheel and fluid-pressure actuated brake means for braking rotation of the wheel, the combination therewith of control means for preventing the wheel from locking during braking and comprising:*

*a mass supported for rotary oscillating movement about a predetermined axis and in alternate directions from an equilibrium position,*

*helical torsion spring means mounted concentrically with said predetermined axis and operatively connected with said mass for defining therewith a swinging system and for imposing on said mass force biasing said mass toward said equilibrium position,*

*said swinging system responding to vibration at a resonant frequency by displacing said mass through more than a predetermined amplitude in alternate directions from the equilibrium position and responding to vibration at any frequency other than said resonant frequency by failing to displace said mass through said predetermined amplitude, and*

*valve means operable between flow permitting and flow blocking positions and operatively connected with said mass for being maintained in flow permitting position while said mass is in said equilibrium position and with said brake means for responding to displacement of said mass through at least said predetermined amplitude by moving from flow permitting position to flow blocking position and thereby interrupting braking effect exerted on said wheel.*

*23. In a rotatable wheel and fluid-pressure actuated brake means for braking rotation of the wheel, the combination therewith of control means for preventing the wheel from locking during braking and comprising:*

*a mass supported for rotary oscillating movement about a predetermined axis and in alternate directions from an equilibrium position,*

*helical torsion spring means mounted concentrically with said predetermined axis and operatively connected with said mass for defining therewith a swinging system and for imposing on said mass force biasing said mass toward said equilibrium position,*

*said swinging system responding to vibration at a resonant frequency by displacing said mass through more than a predetermined amplitude in alternate directions from the equilibrium position,*

*cam surface means mounted on said mass for movement therewith about said predetermined axis,*

*cam follower means for engaging said cam surface means and mounted for linear reciprocation in coordination with rotary oscillating movement of said cam surface means and said mass, and*

*valve means operable between flow permitting and flow blocking positions and operatively connected with said cam follower means for being maintained in flow permitting position while said mass is in said equilibrium position and with said brake means for responding to displacement of said mass through at least said predetermined amplitude by moving from flow permitting position to flow blocking position and thereby interrupting braking effect exerted on said wheel.*

*24. In a rotatable wheel and fluid-pressure actuated brake means for braking rotation of the wheel, the combination therewith of control means for preventing the wheel from locking during braking and comprising:*

*a mass supported for oscillating movement in alternate directions from an equilibrium position,*

*spring means operatively connected with said mass for forming therewith a swinging system, said spring means imposing on said mass a force biasing said mass toward said equilibrium position,*

*said swinging system when vibrating at its resonant frequency displacing said mass through more than a flow blocking amplitude in alternate directions from the equilibrium position,*

*valve housing means for passing pressurized brake actuating fluid to said brake means, and*

*means mounted in said housing means for movement between a first position in which brake fluid flow through said housing means is permitted and a second position in which brake fluid flow through said housing means is blocked and pressure applied to said brake means is released, said movable means being operatively connected to said mass for normally being maintained in said first position and for being moved to said second position when said mass is displaced through more than said flow blocking amplitude in at least one of said alternate directions,*

*said flow blocking amplitude being the minimum amplitude at which brake fluid flow through said housing means is blocked.*

*25. In a rotatable wheel and fluid-pressure actuated brake means for braking rotation of the wheel, the combination therewith of control means for preventing the wheel from locking during braking and comprising:*

*a mass supported for rotary oscillating movement in alternate directions from an equilibrium position,*

*helical torsion spring means operatively connected with said mass for forming therewith a swinging system, said spring means imposing on said mass a force biasing said mass toward said equilibrium position,*

*said swinging system when vibrating at its resonant frequency displacing said mass through more than a flow blocking amplitude in alternate directions from the equilibrium position,*

*valve housing means for passing pressurized brake actuating fluid to said brake means, and*

*means mounted in said housing means for movement between a first position in which brake fluid flow through said housing means is permitted and a second position in which brake fluid flow through said housing means is blocked and pressure applied to said brake means is released, said movable means being operatively connected to said mass for normally being maintained in said first position and for being moved to said second position when said mass is displaced through more than said flow blocking amplitude in both of said alternate directions,*

*said flow blocking amplitude being the minimum amplitude at which brake fluid flow through said housing means is blocked.*

*26. In a rotatable wheel and fluid-pressure actuated brake means for braking rotation of the wheel, the combination therewith of control means for preventing the wheel from locking during braking and comprising:*

*a mass supported for oscillating movement in alternate directions from an equilibrium position,*

*spring means operatively connected with said mass for forming therewith a swinging system, said spring means imposing on said mass a force biasing said mass toward said equilibrium position,*

*motive means operatively connected with said swinging system for causing said swinging system to vibrate at its resonant frequency,*

*said swinging system when vibrating at its resonant frequency displacing said mass through more than a flow blocking amplitude in alternate directions from the equilibrium position,*

*valve housing means for passing pressurized brake actuating fluid to said brake means, and*

*means mounted in said housing means for movement between a first position in which brake fluid flow through said housing means is permitted and a second position in which brake fluid flow through said housing means is blocked and pressure applied to said brake means is released, said movable means being operatively connected to said mass for normally being maintained in said first position and for being moved to said second position when said mass is displaced through more than said flow blocking amplitude in at least one of said alternate directions,*

*said flow blocking amplitude being the minimum amplitude at which brake fluid flow through said housing means is blocked.*

*27. In a rotatable wheel and fluid-pressure actuated brake means for braking rotation of the wheel, the combination therewith of control means for preventing the wheel from locking during braking and comprising:*

*a mass supported for oscillating movement in alternate directions from an equilibrium position,*

*spring means operatively connected with said mass for forming therewith a swinging system, said spring means imposing on said mass a force biasing said mass toward said equilibrium position,*

*motive means operatively connected with said swinging system and said wheel and responsive to predetermined movement of said wheel for causing said swinging system to vibrate at its resonant frequency,*

*said swinging system when vibrating at its resonant frequency displacing said mass through more than a flow blocking amplitude in alternate directions from the equilibrium position,*

*valve housing means for passing pressurized brake actuating fluid to said brake means, and*

*means mounted in said housing means for movement between a first position in which brake fluid flow through said housing means is permitted and a second position in which brake fluid flow through said housing means is blocked and pressure applied to said brake means is released, said movable means being operatively connected to said mass for normally being maintained in said first position and for being moved to said second position when said mass is displaced through more than said flow blocking amplitude in at least one of said alternate directions,*

*said flow blocking amplitude being the minimum amplitude at which brake fluid flow through said housing means is blocked.*

*28. Apparatus for controllably interrupting and releasing fluid pressure applied through a valve housing means and comprising:*

*a mass supported for oscillating movement in alternate directions from an equilibrium position,*

*spring means operatively connected to said mass for forming therewith a swinging system, said spring means imposing on said mass a force biasing said mass toward said equilibrium position,*

*said swinging system when vibrating at its resonant frequency displacing said mass through more than a flow blocking amplitude in alternate directions from the equilibrium position,*

*valve housing means for passing actuating fluid, and*

*means mounted in said housing means for movement between a first position in which actuating fluid flow through said housing means is permitted and a second position in which actuating fluid flow through said housing is blocked and pressure applied through said housing means is released, said movable means being operatively connected to said mass for normally being maintained in said first position and for being moved to said second position when said mass*

*is displaced through more than said flow blocking amplitude in at least one of said alternate directions,*

*said flow blocking amplitude being the minimum amplitude at which fluid flow through said housing means is blocked.*

*29. Apparatus for controllably interrupting and releasing fluid pressure applied through a valve housing means and comprising:*

*a mass supported for rotary oscillating movement in alternate directions from an equilibrium position,*

*helical torsion spring means operatively connected to said mass for forming therewith a swinging system, said spring means imposing on said mass a force biasing said mass toward said equilibrium position,*

*said swinging system when vibrating at its resonant frequency displacing said mass through more than a flow blocking amplitude in alternate directions from the equilibrium position,*

*valve housing means for passing actuating fluid, and*

*means mounted in said housing means for movement between a first position in which actuating fluid flow through said housing means is permitted and a second position in which actuating fluid flow through said housing is blocked and pressure applied through said housing means is released, said movable means being operatively connected to said mass for normally being maintained in said first position and for being moved to said second position when said mass is displaced through more than said flow blocking amplitude in both of said alternate directions,*

*said flow blocking amplitude being the minimum amplitude at which fluid flow through said housing means is blocked.*

*30. Apparatus for controllably interrupting and releasing fluid pressure applied through a valve housing means and comprising:*

*a mass supported for oscillating movement in alternate directions from an equilibrium position,*

*spring means operatively connected to said mass for forming therewith a swinging system, said spring means imposing on said mass a force biasing said mass toward said equilibrium position,*

*motive means operatively connected with said swinging system for causing said system to vibrate at its resonant frequency,*

*said swinging system when vibrating at its resonant frequency displacing said mass through more than a flow blocking amplitude in alternate directions from the equilibrium position,*

*valve housing means for passing actuating fluid, and*

*means mounted in said housing means for movement between a first position in which actuating fluid flow through said housing means is permitted and a second position in which actuating fluid flow through said housing is blocked and pressure applied through said housing means is released, said movable means being operatively connected to said mass for normally being maintained in said first position and for being moved to said second position when said mass is displaced through more than said flow blocking amplitude in at least one of said alternate directions,*

*said flow blocking amplitude being the minimum amplitude at which fluid flow through said housing means is blocked.*

* * * * *

UNITED STATES PATENT OFFICE

CERTIFICATE OF CORRECTION

PATENT NO. : RE. 28,562

DATED : September 13, 1975

INVENTOR(S) : Jan Olov M. Holst, Rolf E. Nordstrom and Christer U. Ekenberg

It is certified that error appears in the above-identified patent and that said Letters Patent are hereby corrected as shown below:

Column 6, Line 27, before "rod" delete --a--;

Column 10, Line 34, before "outlet" delete --said--;

Column 10, Line 66, "and" should be --said--.

Signed and Sealed this

*tenth* Day of *February 1976*

[SEAL]

*Attest:*

RUTH C. MASON
*Attesting Officer*

C. MARSHALL DANN
*Commissioner of Patents and Trademarks*